US008811956B2

(12) United States Patent
Venkatachalam et al.

(10) Patent No.: US 8,811,956 B2
(45) Date of Patent: Aug. 19, 2014

(54) TECHNIQUES FOR LAWFUL INTERCEPTION IN WIRELESS NETWORKS

(75) Inventors: Muthaiah Venkatachalam, Beaverton, OR (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 12/033,928

(22) Filed: Feb. 20, 2008

(65) Prior Publication Data

US 2008/0311891 A1 Dec. 18, 2008

Related U.S. Application Data

(60) Provisional application No. 60/943,866, filed on Jun. 14, 2007.

(51) Int. Cl.
*H04M 3/42* (2006.01)

(52) U.S. Cl.
USPC ........ 455/414.1; 455/405; 455/436; 455/466; 713/201

(58) Field of Classification Search
CPC ..... H04W 12/02; H04W 12/08; H04W 88/02; H04W 24/00; H04W 52/0251; H04W 76/022; H04W 76/028; H04W 76/041; H04W 40/30; H04W 24/08; H04W 36/00; H04W 36/0033
USPC ........ 455/411, 414.1, 456.3, 432.1, 436, 438, 455/439, 440, 405; 713/201
See application file for complete search history.

(56) References Cited

U.S. PATENT DOCUMENTS

| 5,913,161 | A | * | 6/1999 | Ozulkulu et al. | 455/405 |
| 2002/0078384 | A1 | * | 6/2002 | Hippelainen | 713/201 |
| 2004/0185875 | A1 | * | 9/2004 | Diacakis et al. | 455/456.3 |
| 2008/0108322 | A1 | * | 5/2008 | Upp | 455/411 |
| 2009/0100040 | A1 | * | 4/2009 | Sheppard et al. | 707/5 |
| 2009/0220091 | A1 | * | 9/2009 | Howard | 380/277 |

* cited by examiner

*Primary Examiner* — Dinh P Nguyen
(74) *Attorney, Agent, or Firm* — Thorpe North & Western LLP

(57) ABSTRACT

An embodiment of the present invention provides an apparatus, comprising a transceiver operable in a wireless network, wherein the transceiver is configured to enable wireless interception by a predetermined third party without the knowledge of a user of said transceiver, wherein the apparatus uses a secure external interface that is beyond the scope of the 802.16 wireless network, and wherein the operation of the wireless interception includes interception by a law enforcement agency by using a law interception server (LIS), Authentication Authorization and Accounting (AAA), Anchor Auth, Target lawful interception agent LIA and Serving lawful interception agent (LIA) and wherein the LIS first identifies a mobile station (MS) based on input from the law enforcement agency and once the MS is identified, the LIA for the MS is then identified by the LIS and once the LIA is identified, the LIA sends the security association for the MS session to the LIS which then sends this to the law enforcement.

21 Claims, 2 Drawing Sheets

TECHNIQUES FOR LAWFUL INTERCEPTION IN WIRELESS NETWORKS

CROSS REFERENCE TO RELATED APPLICATIONS

The present application claims priority to U.S. Provisional Patent Application Ser. No. 60/943,866, entitled, "TECHNIQUES FOR LAWFUL INTERCEPTION IN WIRELESS NETWORKS" filed 14 Jun. 2007, by Muthaiah Venkatachalam et al.

BACKGROUND

Lawful interception is a critical component of any mobile network in most countries. For example, in the United States, the Federal Communications Commission has mandated Communications Assistance for Law Enforcement Act (CALEA) for this purpose. The main requirement for this would be that the data/VOIP sessions from a mobile station (MS) can be wiretapped by law enforcement without the knowledge of the MS/user that his data is being tapped.

Thus, a strong need exists for techniques for lawful interception in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
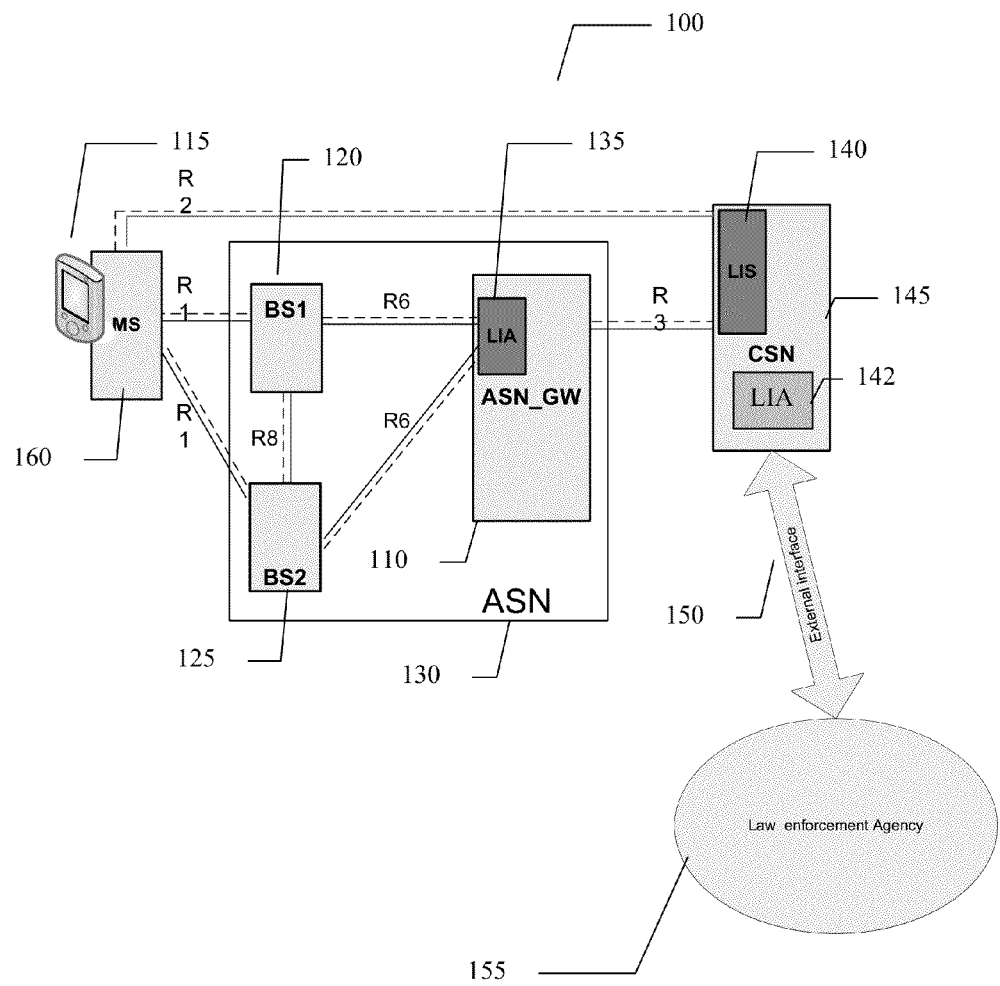
FIG. 1 provides an illustration depicting a lawful interception architecture for a WiMAX network in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Turning now to FIG. 1, at 100, is an embodiment of the present invention which provides for an architecture for lawful interception (LI) with the salient network elements for implementing LI as the following:

a) LIS: LI server 140; and b) LIA: LI agent (in ASN at 135) and (in CSN at 142).

The external law enforcement agency 155 shall contact the LIS 140 in a wireless network, such as, but not limited to, an Institute for Electrical and Electronic Engineers (IEEE) 802.16 (also may be referred to herein as a WiMAX network), using a secure external interface 150 that is beyond the scope of the WiMAX network. The LIS 140 then may identify the LIA 135 in the serving Access Service Network Gateway (ASN-GW) 110 for the MS 115 via base station 1 120 or base station 2 125. In an embodiment of the present invention, the LIA 135 and 142 may be in both the ASN 130 and the CSN 145. Thus, the LIA can be in 3 places in the CSN: a) the big CSN cloud; b) AAA in the CSN; and c) Home agent (HA) in the CSN.

The LIA 135 then forwards the packets and the security association to the LIS 140 which then forwards them to the law enforcement authorities 155.

Figure 2:
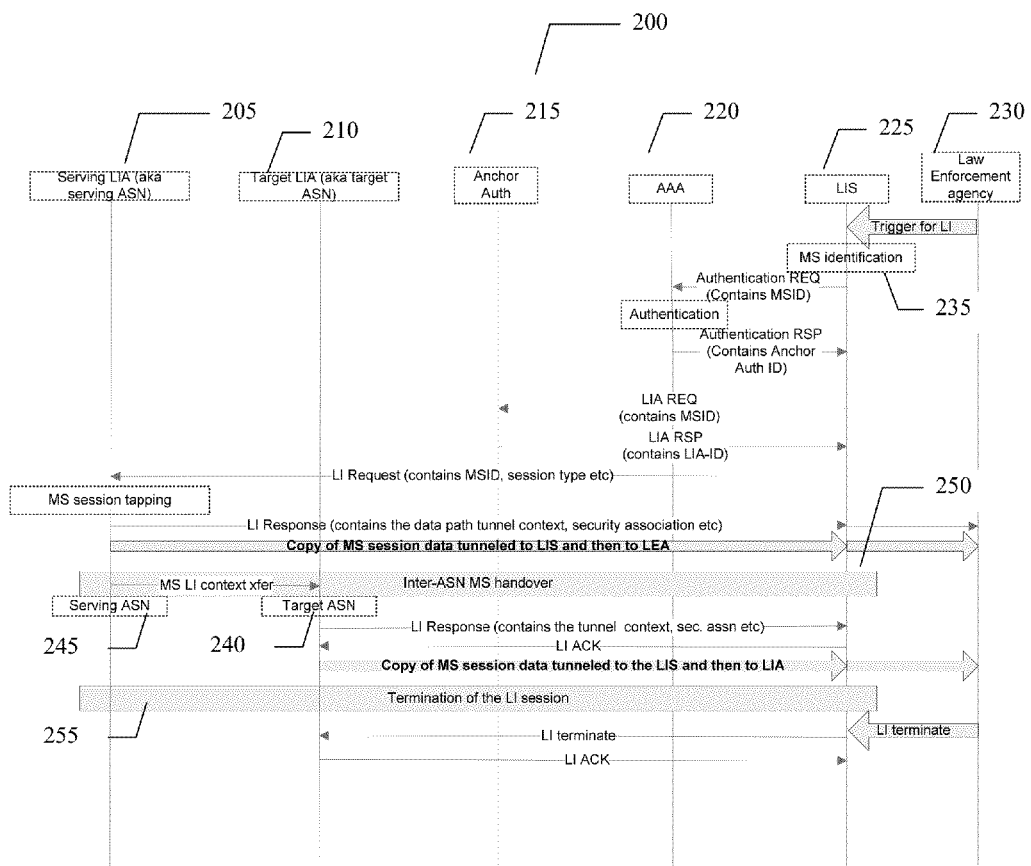
FIG. 2 shows a method for lawful interception in accordance with an embodiment of the invention.

Turning now to FIG. 2 at 200 is shown the normal operation of an embodiment of the present invention and includes Law enforcement agency 230, LIS 225, Authentication Authorization and Accounting (AAA) 220, Anchor Auth 215, Target LIA (aka target ASN) 210 and Serving LIA (aka serving ASN) 205. In this embodiment, the LIS 225 first identifies the MS 235 in question based on the input from the law enforcement agency 230 (this can happen using photographs of the user, telephone number, IP address or other means known to those of ordinary skill in the art); once the MS is identified, the LIA for the MS is then identified by LIS. Once the LIA is identified, the LIA sends the security association for the MS session to the LIS which then sends this to the law enforcement. Then the LIA encapsulates the MS session packets into a tunnel and sends it to the LIS which then sends it to the LIA.

When a handover happens, the LI context is transferred from the serving ASN's 245 LIA to the target ASN's 240 LIA. The target ASN's 240 LIA now establishes the tunnel with the LIS and continues to forward the data of the MS to the LIS. This way the LIS and LEA continue to get the data for the MS despite of the MS handover 250. At some point the LEA may decide to terminate 255 the LI session.

When working under a virtual private networks (VPN) connection through the WIMAX access network to some corporate or other private network, the LEA may get the VPN encrypted packets of this MS. It is then the responsibility of the LEA to contact the private/corporate VPN network to get the keys to the VPN session so as to decrypt the VPN traffic. This operation would be out of the scope of the WIMAX network specification and it is something that would happen between the LEA and the VPN network.

As set forth above, embodiments of the present invention provide a very IP friendly lawful interception architecture for WiMAX network. The other key advantage of the present invention is that there is minimal change to the existing WiMAX network architecture. When implemented, the present invention would be very cost effective as it does not require expensive gateways that needs to centrally monitor all the traffic leaving the network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A system, comprising:

a base station (BS) transceiver of a serving Access Service Network (ASN) of a wireless network for receiving a wireless packet from a mobile station (MS);

a Law Interception Agent (LIA) within the serving ASN for intercepting the wireless packet received by the BS transceiver, and forwarding the intercepted wireless packet to a predetermined third party without the knowledge of the wireless interception by a user of the MS;

a target ASN for receiving a handover of the MS's communication from the serving ASN;

wherein the Law Interception Server (LIS) and the Law Enforcement Agency (LEA) continuously receive data from the MS throughout the transfer of the MS from the serving ASN to the target ASN;

an LIA within the target ASN for receiving a Lawful Interception (LI) context for a session with the MS and for forwarding a target ASN intercepted wireless packet into a tunnel to the LIS and the LEA without knowledge of the wireless interception by a user of the MS, wherein the intercepted wireless packet and the target ASN intercepted wireless packet are associated with the session; and a virtual private network (VPN) connection through the wireless network to a corporate network or a private network, wherein a VPN encrypts the wireless packet as a VPN encrypted packet and a law enforcement agency (LEA) uses VPN keys previously obtained for a VPN session to decrypt the VPN encrypted packet.

2. The system of claim 1, wherein the wireless network is an Institute for Electrical and Electronic Engineers (IEEE) 802.16 wireless network, and the wireless packet includes a Voice over Internet Protocol (VOILE') packet or an Internet Protocol (IP) data packet.

3. The system of claim 1, further comprising a Law Interception Server (LIS) within a Connectivity Service Network (CSN), wherein the LIA within the serving ASN encapsulates the intercepted wireless packet into an MS session packet, generates a tunnel between the LIA within the serving ASN and LIS, and sends the MS session packet using the tunnel from the LIA within the serving ASN to the LIS, and from the LIS to a law enforcement agency (LEA).

4. A method, comprising:

receiving a wireless transmission of a wireless packet from a mobile station (MS) at a serving Access Service Network (ASN) of a wireless network via a base station (BS) transceiver;

intercepting the wireless packet by a Law Interception Agent (LIA) within the serving ASN;

forwarding the intercepted wireless packet to a predetermined third party without knowledge of the wireless interception by a user of the MS;

handing-over the MS's communication with the serving ASN to a target ASN;

wherein the Law Interception Server (LIS) and the Law Enforcement Agency (LEA) continuously receive data from the MS throughout the transfer of the MS from the serving ASN to the target ASN;

transferring a Lawful Interception context for a session with the MS from the LIA within the serving ASN to an LIA within the target ASN;

establishing a tunnel between the LIA within the target ASN and the LIS; and forwarding a target ASN intercepted wireless packet to the LIS and the LEA without knowledge of the wireless interception by a user of the MS, wherein the intercepted wireless packet and the target ASN intercepted wireless packet are associated with the session; and connecting to a corporate network or a private network through the wireless network using a virtual private network (VPN) connection, wherein a VPN encrypts the wireless packet as a VPN encrypted packet and a law enforcement agency (LEA) uses VPN keys previously obtained for a VPN session to decrypt the VPN encrypted packet.

5. The method of claim 4, wherein the wireless network is an Institute for Electrical and Electronic Engineers (IEEE) 802.16 wireless network, and the wireless packet includes a Voice over Internet Protocol (VOIP) packet or an Internet Protocol (IF') data packet.

6. The method of claim 4, further comprising:
encapsulating the intercepted wireless packet into a LIA MS session packet by the LIA within the serving ASN, and wherein forwarding the intercepted wireless packet to a predetermined third party further includes:
generating a tunnel between the LIA within the serving ASN and a Law Interception Server (LIS) within a Connectivity Service Network (CSN); and
sending, using the tunnel, the LIA MS session packet from the LIA within the serving ASN to the LIS, and from the LIS to a law enforcement agency (LEA).

7. The method of claim 4, further comprising selecting the MS using an input from a law enforcement agency (LEA), where the input is selected from the group consisting of: a photograph of the user, a telephone number, and an IP address.

8. A non-transitory machine-accessible medium that provides instructions, which when accessed, cause a machine to perform operations comprising:
receiving a wireless transmission of a wireless packet from a mobile station (MS) at a serving Access Service Network (ASN) of a wireless network via a base station (BS) transceiver;
intercepting the wireless packet by a Law Interception Agent (LIA) within the serving ASN;
forwarding the intercepted wireless packet to a predetermined third party without knowledge of the wireless interception by a user of the MS;
handing-over the MS's communication with the serving ASN to a target ASN;
wherein the Law Interception Server (LIS) and the Law Enforcement Agency (LEA) continuously receive data from the MS throughout the transfer of the MS from the serving ASN to the target ASN;
transferring a Lawful Interception context for a session with the MS from the LIA within the serving ASN to an LIA within the target ASN;
establishing a tunnel between the LIA within the target ASN and the LIS; and
forwarding a target ASN intercepted wireless packet to the LIS and the LEA without knowledge of the wireless interception by a user of the MS, wherein the intercepted wireless packet and the target ASN intercepted wireless packet are associated with the session; and
connecting to a corporate network or a private network through the wireless network using a virtual private network (VPN) connection, wherein a VPN encrypts the wireless packet as a VPN encrypted packet and a law enforcement agency (LEA) uses VPN keys previously obtained for a VPN session to decrypt the VPN encrypted packet.

9. The non-transitory machine-accessible medium of claim 8, wherein the wireless network is an Institute for Electrical and Electronic Engineers (IEEE) 802.16 wireless network, and the wireless packet includes a Voice over Internet Protocol (VOILE') packet or an Internet Protocol (IP) data packet.

10. The non-transitory machine-accessible medium of claim 8, comprising further instructions, which when accessed, further comprise:
encapsulating the intercepted wireless packet into a LIA MS session packet by the LIA within the serving ASN, and wherein forwarding the intercepted wireless packet to a predetermined third party further includes:
generating a tunnel between the LIA within the serving ASN and a Law Interception Server (LIS) within a Connectivity Service Network (CSN); and
sending, using the tunnel, the LIA MS session packet from the LIA within the serving ASN to the LIS, and from the LIS to a law enforcement agency (LEA).

11. The system of claim 6, wherein said the CSN includes a LIA.

12. The system of claim 11, wherein at least one LIA is located within a general CSN, an Authentication Authorization and Accounting (AAA) server in the CSN, or a Home agent (HA) in the CSN.

13. The system of claim 1, further comprising a Law Interception Server (LIS) within a Connectivity Service Network (CSN), wherein the LIS is in communication with the LIA within the serving ASN and the predetermined third party.

14. The system of claim 1, further comprising:
an 802.16 wireless network interface between the LIA within the serving ASN and a Law Interception Server (LIS) within a Connectivity Service Network (CSN); and a secure external interface different from the 802.16 wireless network interface between the LIS to the LEA.

15. The system of claim 13, further comprising:
an Authentication Authorization and Accounting (AAA) server and an Anchor Authenticator in communication with the LIS for authenticating a request by a law enforcement agency (LEA) for the wireless interception, wherein the LEA is in communication with the LIS via an external interface; and
wherein the LIA within the serving ASN generates a security association for a MS session when an identified MS accesses the serving ASN and sends the security association by the LIA within the serving ASN to the LEA via the LIS within a Connectivity Service Network (CSN).

16. The method of claim 4, wherein forwarding the intercepted wireless packet to a predetermined third party further comprises:
transmitting the wireless packet from the LIA within the serving ASN to a Law Interception Server (LIS) within a Connectivity Service Network (CSN) using an Institute for Electrical and Electronic Engineers (IEEE) 802.16 wireless network interface; and
transmitting the contents of the wireless packet from the LIS to the LEA using a secure external interface different from the IEEE 802.16 wireless network interface.

17. The method of claim 4, further comprising prior to intercepting the wireless packet:
identifying the MS for the wireless interception by a law enforcement agency (LEA);
authenticating a request by the LEA for the wireless interception using a law interception server (LIS) in communication with an Authentication Authorization and Accounting (AAA) server and an Anchor Authenticator, wherein the LEA is in communication with the LIS via an external interface;

generating a security association for a MS session when the identified MS accesses the serving ASN;

sending the security association by the LIA within the serving ASN to the LEA via the LIS within a Connectivity Service Network (CSN).

18. The non-transitory machine-accessible medium of claim 8, comprising further instructions, which when accessed, further comprises:

transmitting the wireless packet from the LIA within the serving ASN to a Law Interception Server (LIS) within a Connectivity Service Network (CSN) using an 802.16 wireless network interface; and transmitting the contents of the wireless packet from the LIS to the LEA using a secure external interface different from the 802.16 wireless network interface.

19. The non-transitory machine-accessible medium of claim 8, comprising further instructions, which when accessed, further comprises prior to intercepting the wireless packet:

identifying the MS for the wireless interception by a law enforcement agency (LEA);

authenticating a request by the LEA for the wireless interception using a law interception server (LIS) in communication with an Authentication Authorization and Accounting (AAA) server and an Anchor Authenticator, wherein the LEA is in communication with the LIS via an external interface;

generating a security association for a MS session when the identified MS accesses the serving ASN;

sending the security association by the LIA within the serving ASN to the LEA via the LIS within a Connectivity Service Network (CSN).

20. The method of claim 4, further comprising the LEA terminating the LI session.

21. The method of claim 17, wherein the request includes an MS identification.

* * * * *

UNITED STATES PATENT AND TRADEMARK OFFICE
CERTIFICATE OF CORRECTION

PATENT NO. : 8,811,956 B2  
APPLICATION NO. : 12/033928  
DATED : August 19, 2014  
INVENTOR(S) : Muthaiah Venkatachalam et al.

Page 1 of 1

It is certified that error appears in the above-identified patent and that said Letters Patent is hereby corrected as shown below:

In the Claims,

In column 4, line 34, in claim 2, delete "(VOILE')" and insert -- (VOIP) --, therefor.

In column 5, line 14, in claim 5, delete "(IF')" and insert -- (IP) --, therefor.

In column 6, line 3, in claim 9, delete "(VOILE')" and insert -- (VOIP) --, therefor.

In column 6, line 18, in claim 11, delete "system" and insert -- method --, therefor.

In column 6, line 20, in claim 12, delete "system" and insert -- method --, therefor.

Signed and Sealed this  
Twenty-fifth Day of November, 2014

Michelle K. Lee  
*Deputy Director of the United States Patent and Trademark Office*